United States Patent
Maghirang et al.

(10) Patent No.: US 11,671,686 B1
(45) Date of Patent: Jun. 6, 2023

(54) CAMERA MODULE SUBCOMPONENTS ATTACHED VIA VERTICALLY-SPREAD ADHESIVE

(71) Applicant: Apple Inc., Cupertino, CA (US)

(72) Inventors: Jay C. Maghirang, Singapore (SG); Ng Chin Chuan, Singapore (SG); Howell John Chua Toc, Singapore (SG); Ariel B. Hontiveros, Singapore (SG)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/025,966

(22) Filed: Sep. 18, 2020

(51) Int. Cl.
*H04N 23/54* (2023.01)
*H04N 23/68* (2023.01)

(52) U.S. Cl.
CPC ........... *H04N 23/54* (2023.01); *H04N 23/687* (2023.01)

(58) Field of Classification Search
None
See application file for complete search history.

(56) References Cited

U.S. PATENT DOCUMENTS

| | | | |
|---|---|---|---|
| 7,595,839 B2 * | 9/2009 | Webster | H04N 5/2253 348/374 |
| 9,301,513 B2 | 4/2016 | Ikebukuro | |
| 9,615,555 B2 | 4/2017 | Ikebukuro | |
| 10,107,987 B2 * | 10/2018 | Osaka | G02B 7/08 |
| 10,444,101 B2 | 10/2019 | Kawai et al. | |
| 10,681,251 B2 * | 6/2020 | Park | H04N 5/2254 |
| 10,764,475 B2 * | 9/2020 | Hu | G02B 7/026 |
| 2017/0123180 A1 * | 5/2017 | Osaka | H02K 41/0356 |
| 2018/0095204 A1 * | 4/2018 | Lin | G02B 5/22 |
| 2019/0148429 A1 * | 5/2019 | Wang | H04N 5/2253 348/294 |
| 2019/0227199 A1 * | 7/2019 | Kao | G02B 7/023 |
| 2019/0349523 A1 * | 11/2019 | Song | H04N 5/23229 |
| 2020/0183124 A1 * | 6/2020 | Lee | G03B 17/12 |

FOREIGN PATENT DOCUMENTS

DE 10340248 4/2005

* cited by examiner

*Primary Examiner* — James M Hannett
(74) *Attorney, Agent, or Firm* — Robert C. Kowert; Kowert, Hood, Munyon, Rankin & Goetzel, P.C.

(57) ABSTRACT

A camera module may be assembled from a base component formed of a horizontal surface and having a raised wall that extends vertically from the horizontal surface and a housing component having a vertical surface that affixes to, with adhesive, the raised wall of the base component. Assembly of the camera module may include dispensing adhesive along a top edge of the raised wall to partially overhang the edge and placing the housing component down onto the base component. During assembly, the adhesive that is distributed on the top surface of the raised wall can be sheared or otherwise distributed by the action of the a corresponding wall of the housing component moving to past the top surface and causes at least some of the adhesive to spread between opposing surfaces of respective vertical walls of the base component and the housing component of the camera. The adhesive is then cured.

17 Claims, 12 Drawing Sheets

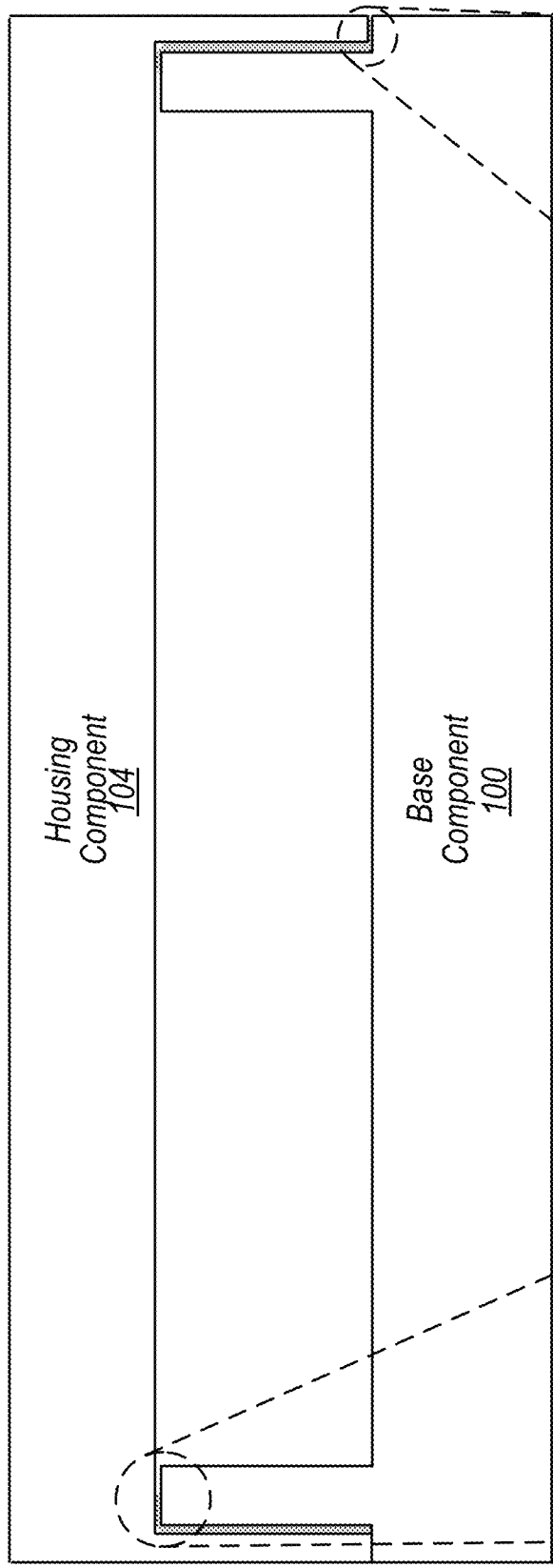
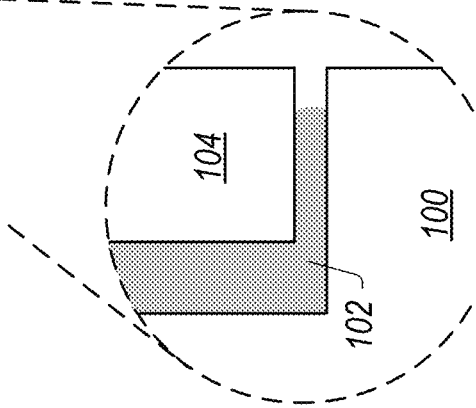
FIG. 6C
FIG. 6A
FIG. 6B

CAMERA MODULE SUBCOMPONENTS ATTACHED VIA VERTICALLY-SPREAD ADHESIVE

BACKGROUND

Technical Field

This disclosure relates generally to camera module, in particular to camera module assembled using adhesive on a vertical surface.

Description of the Related Art

The advent of mobile multipurpose devices such as smartphones, tablet or pad devices to has resulted in a need for more features (e.g., such as bigger lenses, ultra- or super-wide lenses, etc. or other features) for integration in cameras of the devices. Additionally, some cameras may incorporate optical image stabilization (OIS) mechanisms that may sense and react to external excitation/disturbance by adjusting location of the optical lens on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. These and other features may add weight that makes the devices more likely to suffer a failure during a shock (e.g., from a drop or otherwise).

Manufacturing of at least some devices includes creating subassemblies (e.g., a camera lens subassembly (lens stack), a voice coil motor (VCM) subassembly (e.g., magnets and coils), a sensor assembly, etc.) and then coupling the subassemblies together into a camera module for use in a mobile multipurpose device. For example, a camera module may be assembled by attaching, with adhesive, a housing component such as a VCM (or the like) to a base component such as a substrate assembly that houses a camera sensor, and the camera module may be included in a mobile device. Additional adhesive may be used during assembly to avoid mechanical failures.

BRIEF DESCRIPTION OF THE DRAWINGS

FIGS. 6A-C illustrate various locations of adhesive in an assembled camera subassembly, according to some embodiments.

Figure 1:
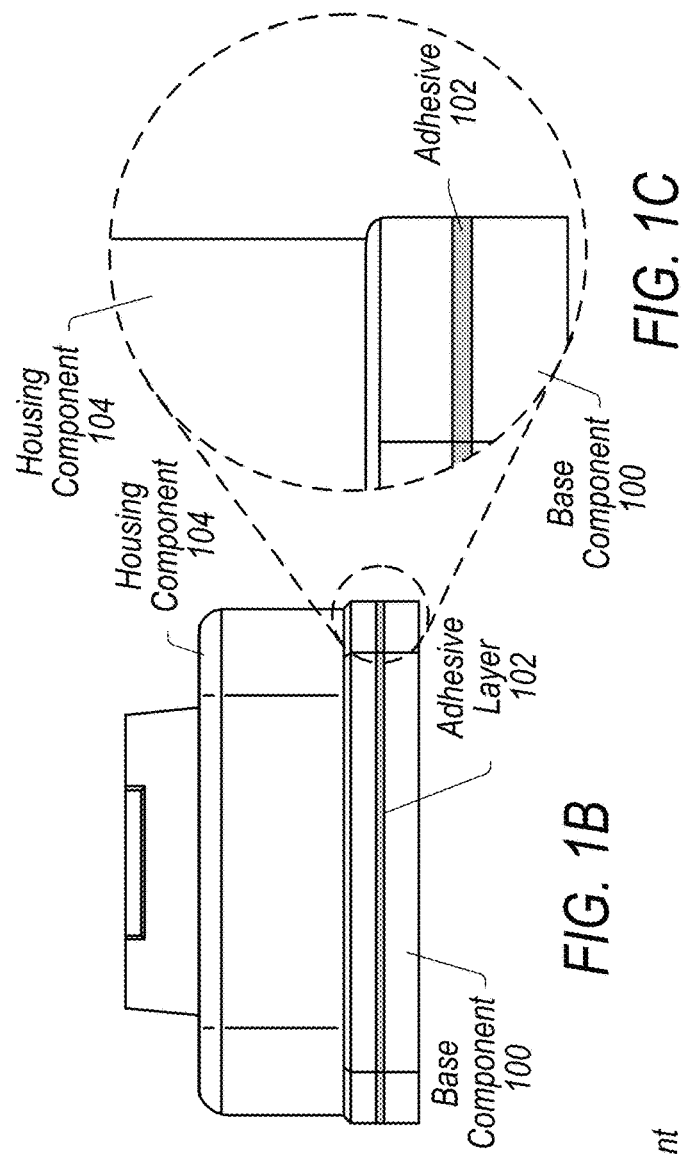
FIGS. 1A-C illustrate an example camera subassembly or module that includes adhesive for adhering a housing component to a base component, according to some embodiments.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

DETAILED DESCRIPTION

Various embodiments described herein include components and component assembly techniques that may be used to assemble various devices and subassemblies of devices, such as, but not limited to, camera modules for mobile multipurpose devices such as smartphones, tablet or pad devices. In embodiments, an available surface area for adhesion between two components is increased via addition of a wall with surface area orthogonal to other surface area of at least one of the components. Such a wall may increase total available surface area for adhesion between two components without expanding the size (e.g., a footprint or height) of the assembled components. Application of the disclosed assembly technique to other components and devices is contemplated without departing from the scope of this disclosure. Also disclosed are techniques for applying adhesive to the surface that is orthogonal to other surface areas of at least one of the components, which may otherwise be hampered by preferred assembly techniques. For example, while preferred manufacturing techniques may apply adhesive to a horizontal surface, at least some embodiments describe herein require adhesive on vertical surfaces.

For some devices, an increase in the number of desired features (e.g., autofocus, image stabilization, zoom, wide-angle lenses, etc.), as well as the design goal to provide the increased functionality in the same or smaller footprint device contribute to a reduced area for locating mechanisms that provide the features, as well as an increase in weight of component subassemblies. Additionally, miniaturization of subcomponents may be challenged by availability of manufacturing processes that can reasonably produce the miniaturized components.

One example process is the assembly of a camera module that includes attaching a subassembly (e.g., a housing component such as an actuator, or lens holder) for providing autofocus and/or image stabilization (e.g., a VCM, or the like) to a base component (e.g., a substrate that holds a camera sensor assembly or the like). A camera module may hold a lens module for holding one or more optical lenses (e.g., a lens barrel or other holder), and an actuator, mounted in the housing component, for actuating optical image stabilization or autofocus for the one or more optical lenses, in embodiments. In some embodiments, an actuator has one or more coils and one or more springs for one or more voice coil motors. Although not an exclusive attachment mechanism, adhesive (sometimes referred to as glue, herein) may be used to attach some such subassemblies together (sometimes referred to as components, herein) in embodiments. A good adhesion strength between subassemblies such as a housing component and a base component of the camera module may ensure the assembled module will not fail during reliability testing (e.g. drop test or the like) or during use in the field. Adhesion strength may depend upon a number of factors, including but not limited to, any of various characteristics of the adhesive and/or surface area of the components to which the adhesive contacts, for example. Adhesion strength may be defined by the glue contact area between the subcomponents (e.g., between a surface of a camera housing component such as a VCM and a surface of the base component (e.g., a sensor assembly). As the number of various components of subassemblies increase (e.g. decreasing available surface area) and/or weight of various components increase (e.g., the increased weight increasing likelihood of failure during a drop), greater adhesion strength may be needed to maintain acceptable adhesion strength for reliability. In embodiments, the adhesive contact area needed on the sensor assembly surface for attaching the housing component may be equal to or greater than the overall camera module size in length and width. As such, it is sometimes desirable to increase the adhesive contact area, without increasing the overall footprint of the assembled module. Described below in FIGS. 1A-C is an example of a device that includes subcomponents of a camera module, attached by adhesive. Also described is a first method of attaching subcomponent of a camera module using adhesive (FIG. 2), followed by a second method of attaching components using an adhesive shearing technique (FIG. 3A-C), with pros and cons of the attachment techniques discussed.

Figure 7:
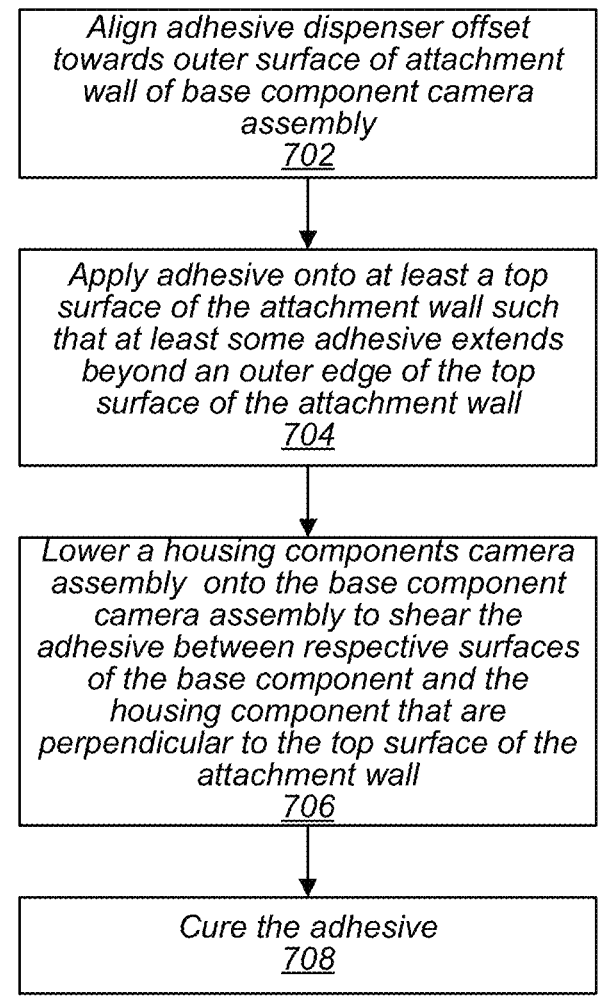
FIG. 7 illustrates an example process chart for adhesive-based assembly of components of a camera, according to some embodiments.
Figure 8:
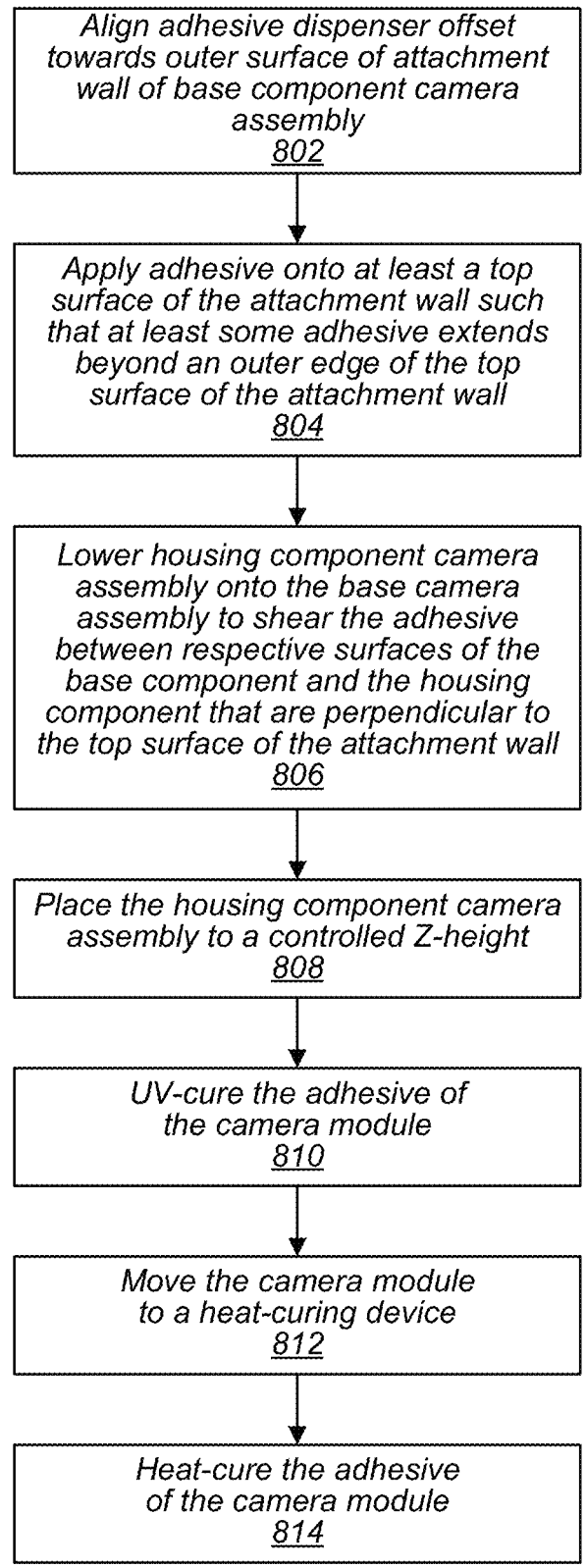
FIG. 8 illustrates an example process chart for adhesive-based assembly of components of a camera that includes a UV-curing step, according to some embodiments.
Figure 9C:
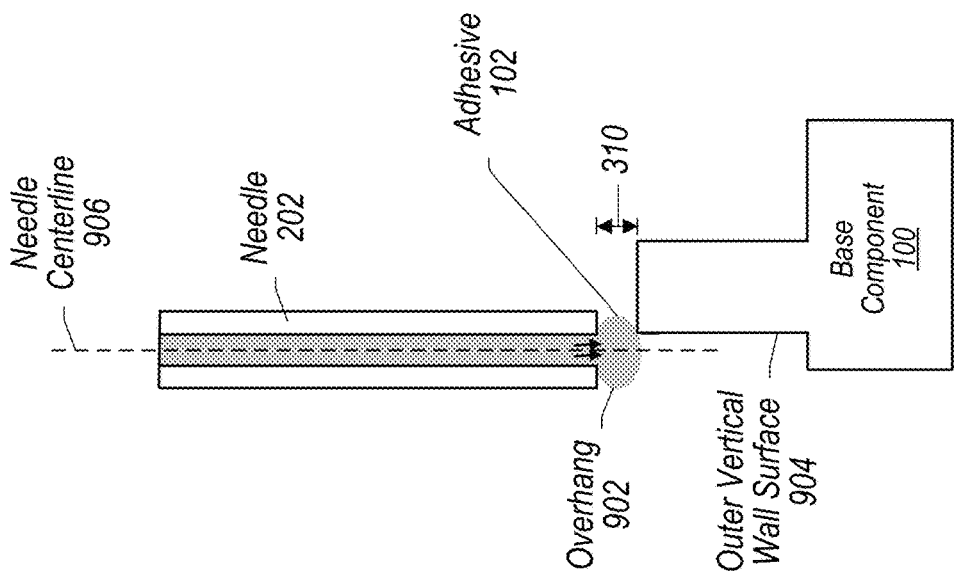
FIGS. 9A-C illustrate various alignments of an adhesive needle with respect to a base component onto with adhesive is being applied, according to some embodiments.
Figure 9B:
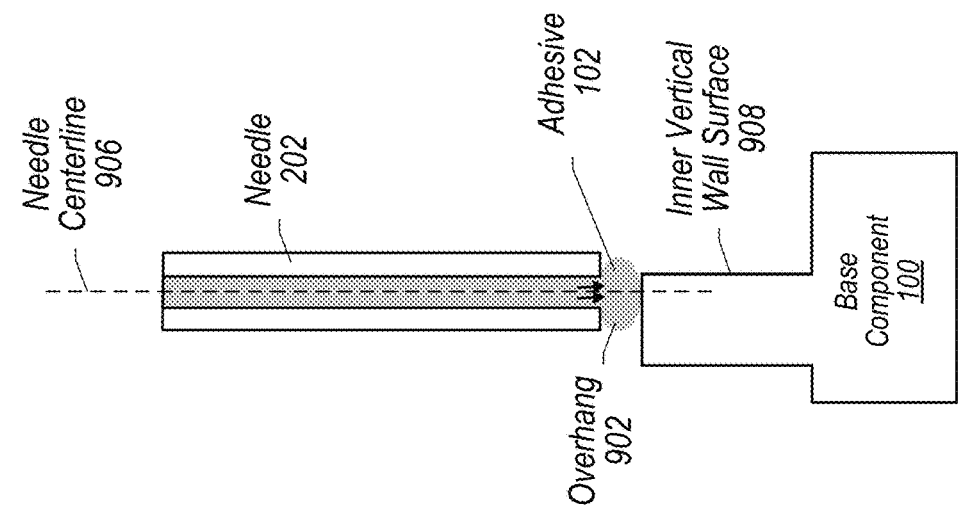
Figure 9A:
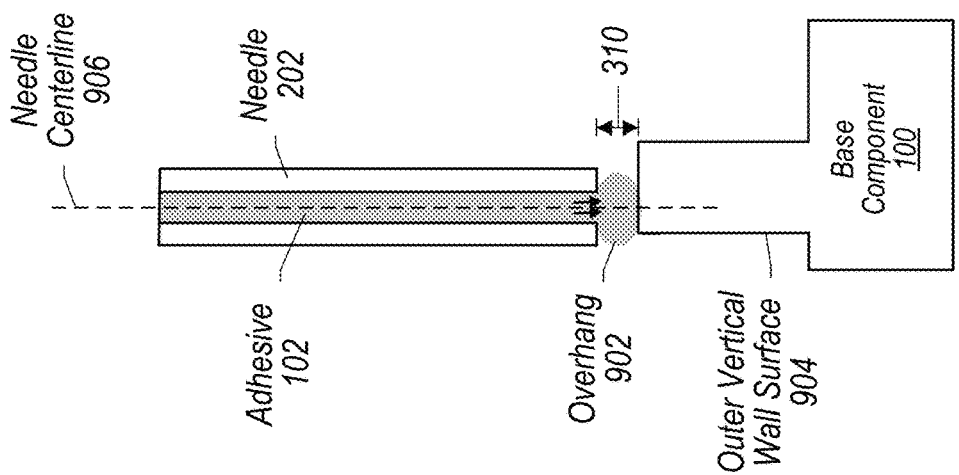
Figure 10:
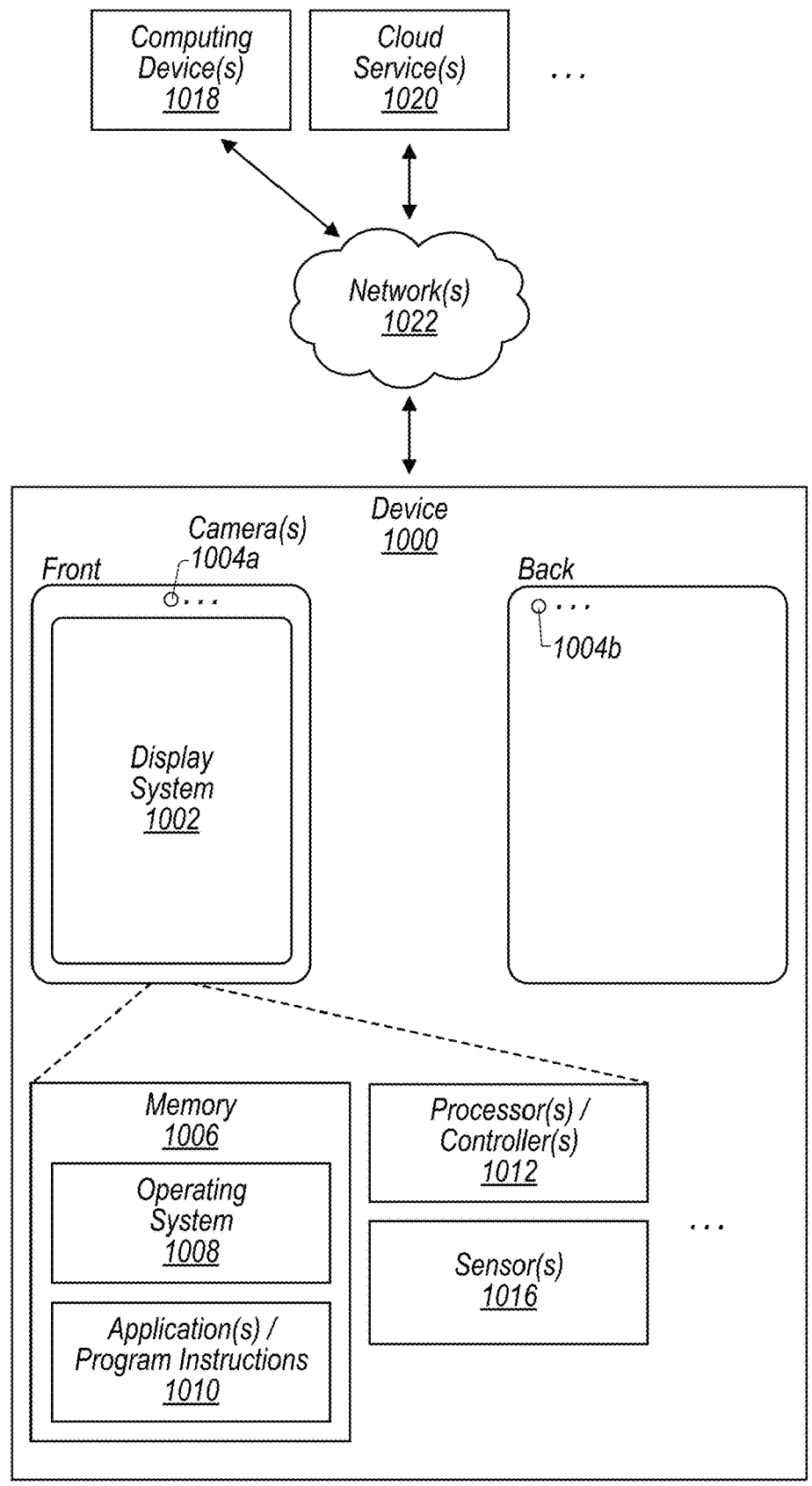
FIG. 10 illustrates a schematic representation of an example device that may include a camera subassembly assembled in a manner described herein, according to some embodiments.

The following FIGS. 1-9 illustrate various different block diagrams, mixed block diagrams/process diagram, and process diagrams that illustrate various aspects of assembling components, such as camera components, using an adhesive. The illustrated techniques may be applicable to other types of devices, in some embodiments. FIGS. 1A-C, 6 and 9 are block diagrams that illustrate examples of subcomponents of a device such as a camera that can be assembled into an assembly such as a camera module. FIG. 10 is a block diagram of a device, various components of which may be assembled in accordance with the embodiments disclosed herein. FIGS. 2-5 are mixed block/process diagrams that illustrate various manufacturing techniques that may be implemented to assemble components of a device, such as a camera module, for example. FIGS. 7 and 8 illustrate process diagrams for assembling devices such as those illustrated in FIGS. 1A-C, 2, 3A-F, 4, 5, 6A-C, and 10, in embodiments.

FIGS. 1A-C illustrate an example camera subassembly that includes adhesive for adhering a housing component to a base component, according to some embodiments. FIG. 1A illustrates base component 100 with an adhesive applied a top surface (e.g., a top surface on an xy-plane) of a perimeter of the base component 100. Base component 100 may be formed from molded plastic or a ceramic, in embodiments. Also illustrated is a housing component 104 with an attached lens assembly 106. It is noted that housing component 104 may include a lens assembly 106 when the housing component 104 is attached to the base component 100, or various components of the lens assembly 106 may be later attached to the assembled camera component that includes both the base component and the housing component, in various embodiments. FIG. 1B illustrates an assembled camera module that includes base component 100, housing component 104, and adhesive layer 102 that is sandwiched between the base component 100 and the housing component 104. FIG. 1C shows an expanded view of a corner of the camera module and illustrates adhesive layer 102 that is sandwiched between the base component 100 and the housing component 104.

Figure 2:
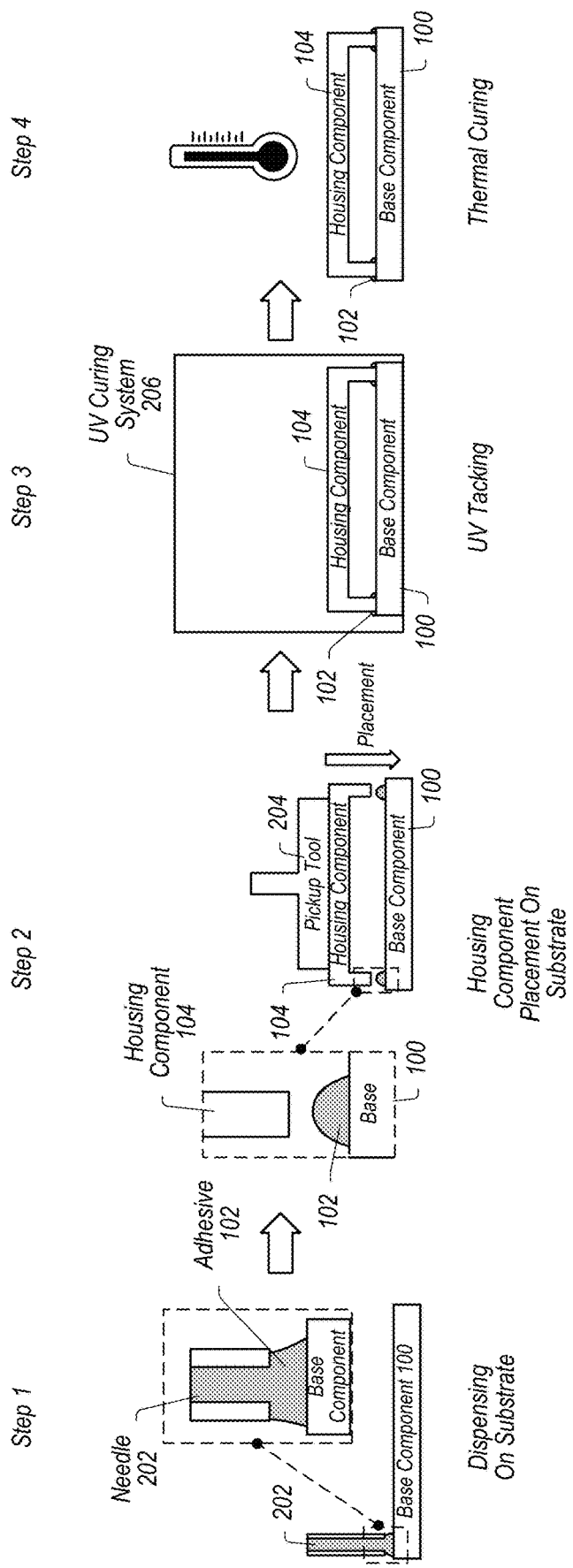
FIG. 2 illustrates a process for assembling a camera subassembly from a housing component and a base component using adhesive, according to some embodiments.

FIG. 2 illustrates a process for assembling a camera subassembly from a housing component (e.g., such as an actuator or optics holder) and a base component using adhesive, according to some embodiments. The components of camera module depicted in FIGS. 1A-C may be assembled into a camera module using the assembly technique illustrated in FIG. 2, in embodiments. Starting on the left side of FIG. 2, in Step 1 adhesive is dispensed from a dispensing needle 202 on top of the edge (perimeter) of the base component 100 (e.g., a sensor assembly or the like), by a fully automatic dispensing and pick and place machine, for example. As an example of the scale for such activity, target adhesive width after dispensing is greater than or equal to about 400-500μ (microns). In Step 2 the housing component 104 (e.g., a VCM or the like) is then placed on top of the base component 102 (e.g., a sensor assembly or the like). Placement may be by a machine (e.g., by a pick and place machine, such as a fully automated high placement accuracy machine using a pickup tool 204) in embodiments. For example, a VCM may be picked-up from shipping tray/tape and reel carrier and placed on top of the substrate/sensor assembly. During placement, adhesive may be compressed and can form a fillet. Compressed adhesive 102 after VCM placement may increase from original dispense width, with a glue thickness formed in between VCM and substrate of about 15 to 30 um, in embodiments.

It is contemplated that in at least some embodiments, the base component may be moved towards the housing component, the housing components may be moved towards the base components, or both components may be moved towards one another to assemble the camera module. Step 3 illustrates that the adhesive 102 is then cured using UV light (e.g., while still at the pick and place machine) to ensure the housing component 104 will not move during transportation (e.g., during transport from the pick and place machine to a thermal curing oven or other environment). For example, adhesive may be immediately cured using UV light (e.g., in-situ), to ensure the VCM does not move with reference to the substrate/sensor assembly. FIG. 2 illustrates that at Step 4, a thermal curing process follows to ensure the adhesive 102 is fully cured and attains the required adhesion strength between the housing component and base component. For example, the sensor assembly with the VCM will go to a thermal curing process to fully cure the adhesive and ensure that the VCM will not be detached from the sensor assembly during reliability test or in the field when system is accidentally dropped.

While the technique illustrated in FIG. 2 is useful, in some embodiments, there are limitations to the technique. New features, as well as improvements to existing features (e.g., the need to improve camera low light performance or other features) means that the size of features of the camera (e.g., the size of the sensor and the lens of the camera module) needs to increase thereby increasing the camera module weight. For example, for at least some camera module designs and the above-described attach process the glue contact area needs to significantly increase to meet desired characteristics such as ensuring the camera module will not fail (e.g., during a drop test). A defined area is needed on the xy-surface of the base component to ensure good adhesion strength is attained and glue overflow is controlled (e.g., it may be undesirable for glue to show on the outside of an assembled module). In some cases, the area required for the adhesive adds to the overall module size (length and width). In embodiments, increasing the glue contact area in the xy-plane of the base component illustrated in FIG. 2 to accommodate the target adhesion further increases the camera module size, which may not be desirable, in some embodiments.

Figure 3A:
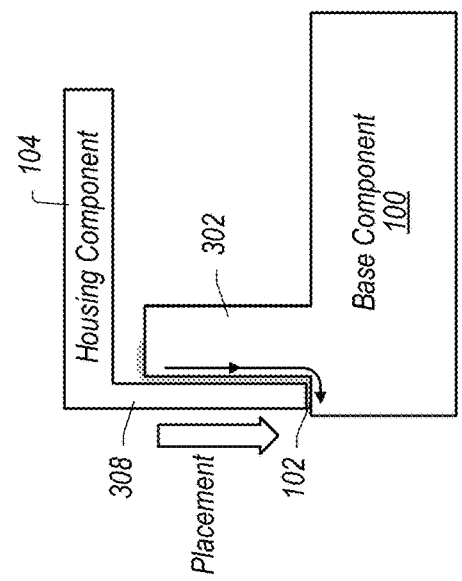
FIGS. 3A-F illustrate an adhesive-based camera component assembly process, and various alternative configurations for the assembly, according to some embodiments.
Figure 3B:
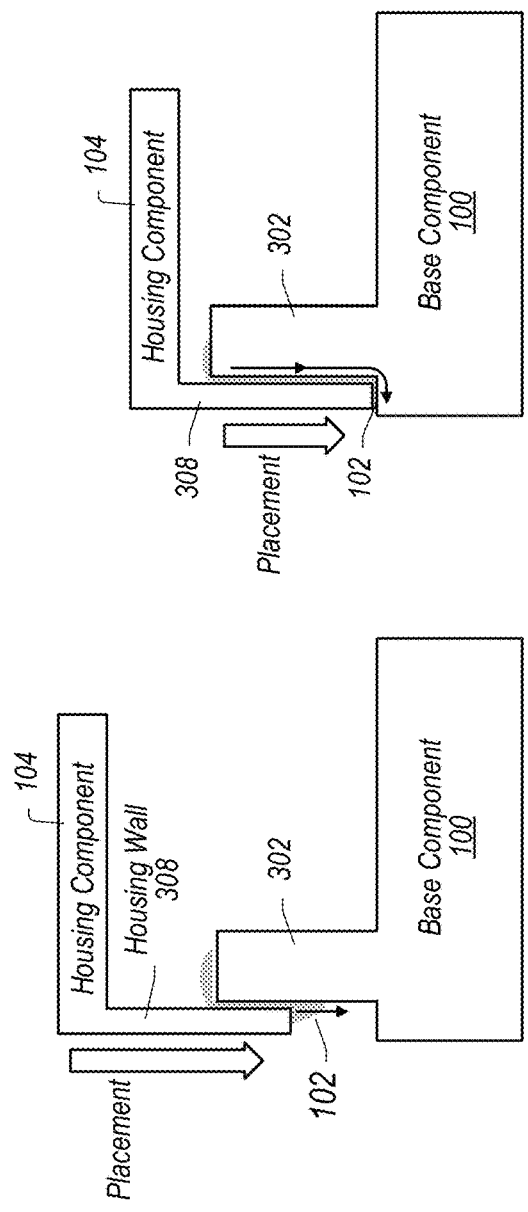
Figure 3C:
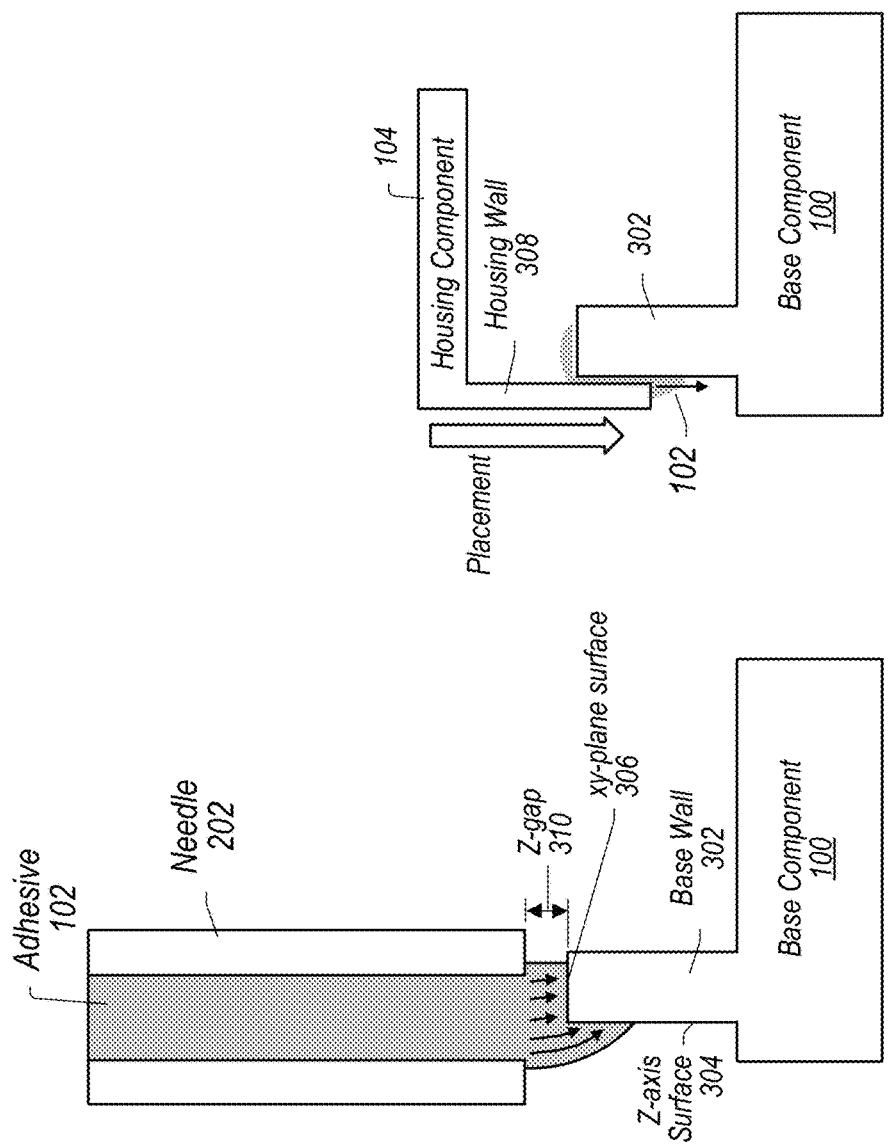

In some embodiments described herein, the base component may include a vertical area (e.g., a wall having a surface oriented in a z-axis 304 with respect to the xy-plane of the base component) to be used as a glue contact area (either in addition to, or in place of the glue contact area in the above-noted FIGS. 1 and 2). Such a vertical area may be created when the base component is formed (e.g., from molded plastic, ceramic, or the like) or may be added to the base component, in embodiments. FIGS. 3A-C illustrates another adhesive-based camera component assembly process, according to some embodiments, that uses an adhesive 102 between z-axis (sometimes illustrated as vertical, herein) walls of the base 100 and housing 104 components. As noted previously, some preferred manufacturing techniques may dictate that adhesive is applied to a horizontal surface, but at least some embodiments described herein require adhesive on vertical surfaces. The process and components illustrated in FIGS. 3A-F, 4, 5, 6, 7, 8 and 9A-C illustrate solutions that retain the preferred application of adhesive to a horizontal surface, but ultimately ends with an assembly held together by the adhesive being located substantially on vertical surfaces. Although some embodiments describe application of the adhesive on a horizontal surface by a needle that is facing downward, it is contemplated that in at least some embodiments, adhesive may be applied directly to a vertical surface by an application device, such as a needle, or the like, that is oriented to be facing to the side or at an angle, in embodiments. Such a process may eliminate the need for the shearing action of the placement process illustrated in FIGS. 3A-C, 5, 6, 8 and 9, for example, but still produce an assembly that is adhered together with adhesive on substantially vertical surfaces, in some embodiments.

Illustrated is a base component 100 design having wall 302 on, or near-to-but-not-fully at, the perimeter of the base component. In embodiments, the wall of the base component is a continuous wall formed around a location for the camera sensor. In some embodiments, the corresponding inward-facing vertical surface of the housing component is a continuous vertical surface. The wall may be of varying height around the wall's circumference, but be circumferentially-continuous, in embodiments. In embodiments, the wall provides additional surface area to increase the adhesive coverage without increasing the module size. For example, some embodiments implement an adhesive 102 contact between vertical walls (e.g., z-axis-oriented surface 304) of the base component 100 and housing component 104. However, at least some known methods of dispensing adhesive during assembly of such camera components is not suitable for application to vertical walls. In some instances, manufacturing limitations prevent or at least inhibit dispensing adhesive on vertical surfaces such as those illustrated in FIG. 3A (e.g., z-axis-oriented surface 304). For example, adhesive may be dispensed (e.g., by a needle) onto a horizontal or xy-plane surface, as illustrated in FIG. 2. But such an adhesive dispensing technique as that illustrated in FIG. 2 is not suitable for dispensing adhesive onto vertical, z-axis-oriented surface, as the needle cannot properly place the adhesive on such a surface, at least not in the quantity and with the accuracy needed for the target adhesion levels, in some embodiments. For example, either the needle would have to be turned and operated at a right angle from its illustrated operation in FIG. 2, or the base component would have to be turned so that the vertical z-axis surface of the base wall 302 faces the opening of the needle. Neither of which is a preferred technique for manufacture devices such as camera modules, at least due to limitations of equipment and/or an increased number of processing steps, in some embodiments.

Additionally, while the technique of assembly illustrated in FIG. 2 has the advantage of sandwiching the adhesive between two components as the two components are moved together (a technique that does little to disturb the adhesive from the location to which it is dispensed or placed, so the adhesive predictably stays where it was dispensed) the orientation of two surfaces sliding past one another as in FIGS. 3A-F causes at least some of any adhesive that was located on the two surfaces to be disturbed (e.g., it will be moved from the location it is dispensed or placed, making the contact area of adhesion between the two components less predictable, in embodiments).

FIG. 3A illustrates adhesive needle 202 that is dispensing adhesive 102 onto a wall 302 of base component 100, according to some embodiments. In at least the depicted embodiment, the needle is located in an orientation with the base component 100 that places adhesive onto both an xy-plane surface 306 running along a top of the base wall 302 as well as onto a z-axis oriented, or vertical, surface 304 that is a side surface 304 of the base wall 302 (e.g., an outer substrate wall of a camera sensor assembly). In at least the illustrated embodiment, the adhesive is placed onto a corner of xy-plane surface 306 by the dispensing needle and some of the adhesive placed onto the wall overhangs the corner of wall 302. In some embodiments, depending upon the characteristics of the adhesive, and/or characteristics/orientation of the needle and adhesive application process (e.g., the speed of the needle as the needle moves along the top surface of the wall 302, or the gauge of the dispensing needle, or a rate of flow of the adhesive leaving the needle, or the like) the adhesive 102 that overhangs xy-plane surface 306 may, or may not, drip or otherwise move in the direction pulled by gravity down past the xy-plane surface 306. In some embodiments, the adhesive that overhangs the corner between xy-plane surface 306 and z-axis oriented surface 304 may (e.g., based on gravity) move down below the xy-plane, and may or may not come into contact with z-axis oriented surface 304 (e.g., during or sometime after dispensing from the needle or other type of application, but prior to placement of the housing component 104 onto the base component 100). Adhesive 102 may be placed in various different orientations along the top surface, with regard to the wall 302 of base component 100, as illustrated in FIGS. 9A-C, described below, for example. During dispensing of adhesive 102, the needle center may be oriented to be in alignment with z-axis surface 304 (e.g., an outer surface of the substrate wall 302), although various offsets from that alignment are contemplated, in various embodiments. The distance between the top of the base wall 302 and the needle during dispensing of adhesive 102 may be on the order of 0.1 mm or less, in embodiments.

FIG. 3B illustrates placement of housing component 104 down onto base component 100. In some embodiments, the base component that is assembled into the camera module holds, prior to assembly, a camera sensor (the individual components are assembled as components holding or housing various interior pieces). For example, in some embodiments, one or more actuators for actuating an optics package are assembled in the housing component prior to assembly of the base and housing components together.

In at least the illustrated embodiment, the adhesive 102 that was dispensed by adhesive needle 202 onto xy-plane surface 306 of wall 302 is disturbed (e.g., sheared) by the action of the housing wall 308 of housing component 104 moving past the base wall of the base component 100. In various embodiments, some of which depend upon how the adhesive has formed or attached to the base component during dispensing from the needle 202, different surfaces of the housing wall 308 may come into contact with the adhesive formed on the base wall 302 and move the adhesive as part of the placement action of the housing component 104. For example, in some embodiments, the bottom surface of the housing wall 308 (a surface in the xy-plane) and/or a corner formed with the bottom surface, may come into contact with the adhesive 102 formed on the base wall 302 and move the adhesive as part of the placement action of the housing component 104. In another example, in some embodiments, the inner surface of the housing wall 308 (a surface 304 in the z-axis orientation) may come into contact with the adhesive 102 formed on the base wall 302 and move the adhesive as part of the placement action of the housing component 104. In some embodiments, a combination of the inner surface and the bottom surface (e.g., a corner) may move the adhesive. Movement of the adhesive 102 by either one of, or by a combination of, the surfaces may cause the adhesive to shear from where it was placed by the needle and move down along, and come into contact with, a z-axis-oriented or vertical, surface 304 of the base wall 302. In some embodiments, one of the surfaces may disturb the adhesive, without the other surface disturbing the adhesive.

In FIG. 3B, a combination of the inner surface and the bottom surface (e.g., that meet at a corner) of the housing component 104 has sheared the adhesive 102 down and along an outer surface of base wall 302, leaving some of the adhesive on the top surface of the base wall 302, where it was placed by the needle 202. In embodiments, the displacement of the adhesive leaves a trail of adhesive contact along and between the respective z-axis-oriented surfaces of base wall 302 and housing wall 308, thereby causing the base component 100 and the housing component 104 to be adhered together. Once the adhesive 102 has been cured, the adhesive 102 between the base component 100 and the housing component 104 solidly adheres the base component 100 and the housing component 104 together, in embodiments. The adhesion between the base component 100 and the housing component 104 may be strong enough to withstand reliability testing (e.g. drop test or the like) or vibrations experienced during use in the field, for example.

FIG. 3C illustrates (in gray between the base component 100 and the housing component 104) that adhesive 102 has been spread from where it was placed on top of the base wall 302 to points along a z-axis surface 304 between base wall 302 and housing wall 308 of housing component 104. FIG. 3C illustrates (with curved arrows) that the movement of the adhesive (e.g., a shearing action) caused by the placement of housing component 104 towards and in arrangement with base component 100 has caused the adhesive to be dislocated from the top xy-plane horizontal surface of base wall 302 down along a z-axis vertical surface of base wall 302. In the illustrated embodiment, at least some of the adhesive 102 has been sheared by the bottom xy-plane surface of housing component 104 down to an xy-horizontal surface of the base component 100 that extends from the bottom of the base wall 302 to an outer edge of the base component 100. In embodiments, the disclosed process uses particular positioning of the needle 202 during dispensing to achieve the end-location of the adhesive. In embodiments, the disclosed process uses specific positioning of the housing component 104 during the adhesive shearing process to achieve the desired end-location of the adhesive. In embodiments, the technique provides full coverage on the outer wall area ensuring improved adhesion strength between the housing component 104 and base component 100. Generally, FIGS. 3A-C illustrate an assembly process that begins with placement of adhesive substantially along and on top of a base wall but that ends with an assembled component with adhesive substantially oriented vertically along a side wall of the base wall. In embodiments, a shearing action acting on the adhesive acts to distribute the adhesive from the top of the base wall vertically along a side wall of the base wall. To provide some idea of scale, it is contemplated that the distance between the walls that are adhered together, where the adhesive lies, is on the order of 15-30µ (microns) for example. In embodiments, the disclosed technique may be practiced with existing equipment such as fully automatic dispensing and pick and place machines, that applies the glue to a horizontal surface.

As illustrated in FIG. 3C, in at least some embodiments, the addition of the base wall 302 adds the additional vertical surface area for more adhesive while also retaining the original horizontal surface area used for the adhesive by using the top surface of the base wall 302 for adhesive 102 as well as the bottom surface of the housing wall 306.

It is contemplated that in at least some embodiments, adhesive 102 may be applied to the housing component 104 (or the component that is moved and placed onto the other component) and that placement of the housing component 104 on the base component 102 could spread the adhesive along a vertical wall via a similar shearing action as described herein.

Figure 3D:
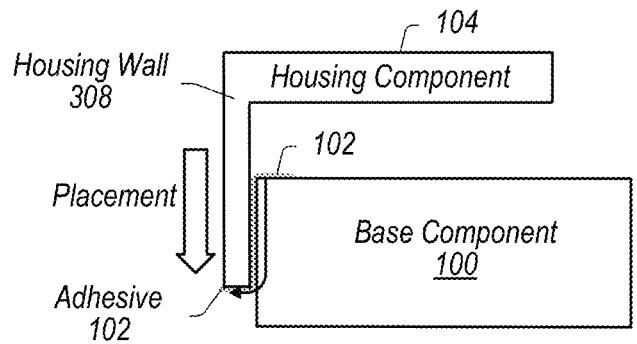
Figure 3E:
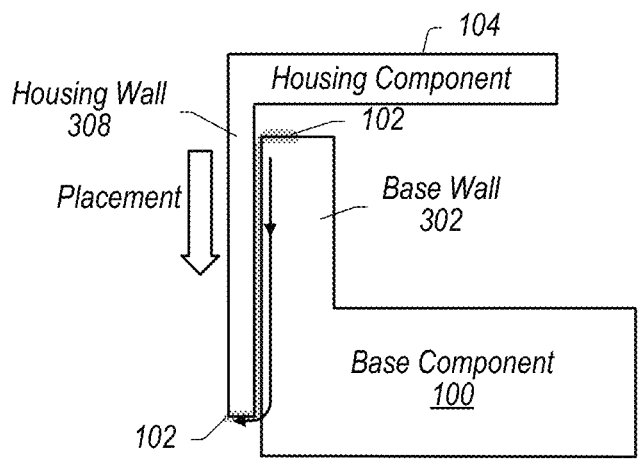
Figure 3F:
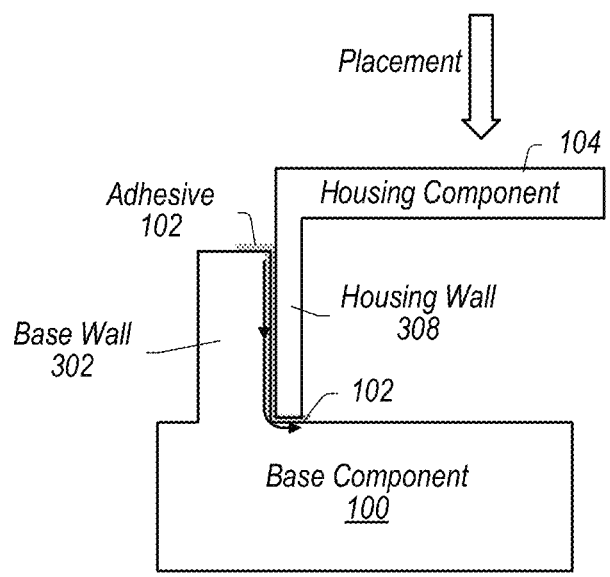

FIGS. 3D-F illustrate alternative shapes/designs of the components. It is contemplated that the outer wall of the base component 100 depicted in FIGS. 1A-C could act as a vertical surface for adhesion, in some embodiments, with the housing component 104 expanded in size to fit over the outer wall, instead of on top of the base component 100 (illustrated in FIG. 1A-C). For example, FIG. 3D illustrates base component 100 without the vertical base wall 302, and that housing component 104 is attached to the base component via an inside surface of the housing wall 306 being adhered via adhesive 102 to the outside edge/vertical surface of the base component 100.

In some embodiments, base wall 302 may be formed at, or along, or flush with, the outside edge or perimeter of base component 100, instead of being somewhat inset as illustrated in FIGS. 3A-C and 3F. For example, FIG. 3E illustrates base wall 302 formed flush with the outside edge of base component 100 and that housing component 104 is attached to the base wall 302 of base component 100 via an inside surface of the housing wall 306 being adhered via adhesive 102 to the outside edge of the base wall of base component 100.

It is contemplated that in at least some embodiments, the base component 100, base wall 302, housing component 104 and adhesive 102 may be configured such that assembly results in the housing wall 306 of the housing component 104 sitting inside base wall 302, with the adhesive in-between. For example, FIG. 3F illustrates an outside surface of housing wall 306 adhered to an inner surface of base wall 302.

In some embodiments, a method of assembling a camera module includes dispensing an adhesive on a first wall of a first component, wherein, based on the dispensing, at least a portion of the adhesive is provided on a surface of the first wall that extends in a shearing direction at which a second wall of a second component is to be moved in accordance with a shear movement placement process for placing the second component in an attachment position at which the second component is to be attached to the first component. The method further includes placing, using the shear movement placement process, the second component in the attachment position. In embodiments, the placing includes moving the second wall in the shearing direction beside the first wall, such that shear movement between the first wall and the second wall spreads the portion of the adhesive along a plane between the surface of the first wall and a surface of the second wall, and such that, in the attachment position, the portion of the adhesive is sandwiched between the second wall and multiple surfaces of the first component. The process may also include curing the adhesive to fixedly attach the second component to the first component in the attachment position, in embodiments.

Figure 4:
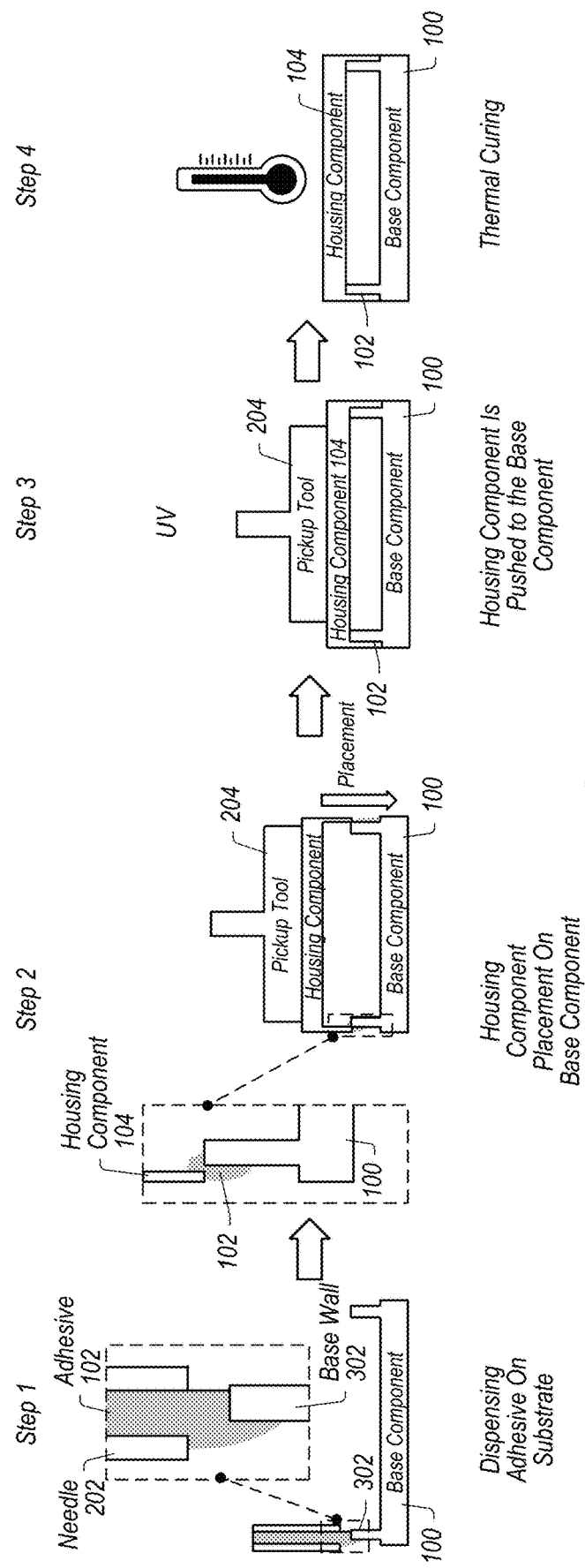
FIG. 4 illustrates an example process for assembling components of a camera using an adhesive shearing technique, according to some embodiments.

FIG. 4 illustrates an example process for assembling components of a camera using an adhesive shearing technique, according to some embodiments. At Step 1, an adhesive is dispensed on top of the base wall 302 (e.g., a substrate/sensor assembly wall) by a needle 202 using a full auto dispensing and pick and place machine (not illustrated). In some embodiments, the needle is positioned offset to the outside wall 302 surface edge of the base component assembly. For example, the needle center may be positioned at or off-set from an edge of the base wall 302 outside surface, in various embodiments.

At Step 2, a housing component 104 (e.g., a VCM or the like) is picked-up from a shipping tray/tape and reel carrier and placed on top of the base component 100. At step 3, the housing component 104 is placed and pushed down to the base component (e.g., by a force controlled bond head, in embodiments). During Step 3, adhesive (sometimes referred to as glue or the like) is disturbed or sheared by the housing component (e.g., a VCM can or the like) during the push process, causing the glue to be spread along the common-facing surfaces of the base component and the housing component, in embodiments. Glue coverage is dependent on the volume of adhesive dispense and sensor assembly wall height, in embodiments. In embodiments, the wall 302 is made as high as possible to maximize the glue coverage/contact area between the base component and the housing component. At Step 4, the assembled module (e.g., a camera module that includes a sensor assembly with VCM or the like) is moved to where a thermal curing process is performed to fully cure the adhesive and ensure components will not become detached (e.g., so that the VCM will not be detached from the sensor assembly during reliability test or at the field when system is accidentally dropped).

Figure 5:
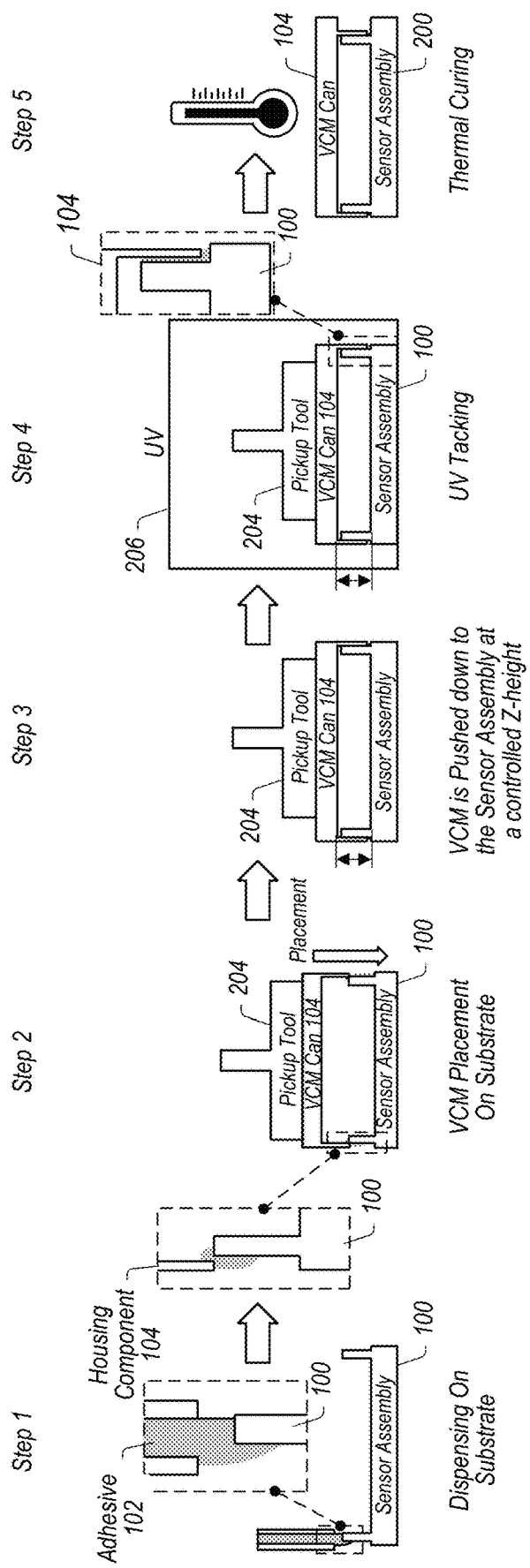
FIG. 5 illustrates an example process for assembling components of a camera, including a UV tacking process, according to some embodiments.

FIG. 5 illustrates an example process for assembling components of a camera, including a UV tacking process, according to some embodiments. In some embodiments, the process illustrated in FIG. 5 is similar to that of FIG. 4, but includes controlling the Z-height of the VCM 104 in Step 3 of FIG. 5 as well as an additional UV 206 tacking (Step 4 in FIG. 5). Either of these illustrated steps may be eliminated or included, together or separately, in an assembly process, in various embodiments. FIG. 5 is illustrated as attaching a VCM to a Sensor Assembly, in particular, while FIG. 4 is illustrated as attaching a housing component to a base component. It is contemplated that either process may be used with either type of components, or for other components not necessarily illustrated, in various embodiments.

As illustrated in FIG. 5, at Step 1, adhesive 102 is dispensed on top of the substrate/sensor assembly 100 wall by a needle 202 using a full auto dispensing+pick and place machine (not illustrated). The needle 202 is positioned (e.g., offset to the outside wall surface edge of the sensor assembly). At Step 2, the VCM is picked-up by pickup tool 204 from a shipping tray or tape and reel carrier and placed on top of the substrate/sensor assembly 100. Glue 102 is sheared by the VCM can during the placement process illustrated in Steps 2 and 3. Glue coverage is dependent on the volume of adhesive dispense and sensor assembly wall height, in embodiments. At Step 3, a Machine Bond head 204 moves down and pushes the VCM 104 to a controlled Z-height position. For example, the z-height position measures a distance between surfaces of the VCM and Sensor Assembly, such as a distance between an xy-plane surface at the top of the wall where the glue was placed by the needle and the inner xy-plane surface of the VCM just above the top of the wall where the glue was placed. Other distances between physical features of the various component may be used to establish the Z-height position, in embodiments. At Step 4, sheared glue that flows from disturbance by the VCM Can is UV tacked (e.g., in-situ or otherwise) to ensure the VCM will not move down and maintains the controlled Z-height during transport to thermal cure oven, for example. AT Step 5 the Sensor assembly and VCM package will go to thermal curing process to fully cure the adhesive and ensure the VCM and Sensor Assembly do not separate during reliability test or at the field (e.g., if system is accidentally dropped or otherwise physically shocked).

FIGS. 6A-C illustrate various locations of adhesive 102 in an assembled camera subassembly, according to some embodiments. FIGS. 6B and 6C are enhanced views of the camera module illustrated in FIG. 6A. FIGS. 6B and 6C illustrate that, in at least some embodiments, adhesive 102 may not only contact (and adhere to) what are illustrated as the vertical walls of the housing 104 and base 100 components, but may also contact (and adhere to) what are illustrated as the horizontal walls of the housing 104 and base 100 components. In some embodiments, the glue dispensing process as well as the component placement process may be adjusted so that more, less or none of the adhesive is located between what are illustrated as the horizontal walls of the housing 104 and base 100 components. For example, in some embodiments, it may be desirable to adjust the assembly process such that no-to-little adhesive is distributed to the location between the lower horizontal walls of the housing 104 and base 100 components illustrated in FIG. 6C (e.g., for aesthetic or other reasons). Similarly, various characteristics of the disclosed assembly process may be adjusted to avoid excess adhesive from being pushed out between the location between the lower horizontal walls of the housing 104 and base 100 components illustrated in FIG. 6C, in embodiments.

FIG. 7 illustrates an example process chart for adhesive-based assembly of components of a camera, according to some embodiments. The process may be used in concert with components illustrated in FIGS. 3A-F, 4, 5, 6A-C, and 9A-C, for example. At block 702 an adhesive dispenser (e.g., adhesive needle 202, or the like) is aligned offset towards an outer surface of an attachment wall (e.g., base wall 302) of a base component camera assembly (e.g., base component 100). FIGS. 9A-C illustrate various alignments are possible, with corresponding affects on adhesive placement and corresponding effects on shearing of adhesive along the vertical walls is described for FIGS. 9A-C.

At block 704, adhesive 102 is applied onto at least a top surface of the attachment wall such that at least some adhesive extends beyond an outer edge of the top surface of the attachment wall. FIG. 3A illustrates an example application where adhesive is applied to a corner of base component 100, coming into contact with both surfaces that come together to form the corner. FIGS. 9A-C illustrate examples where glue is placed solely on the top surface, and sometime extends over as an overhang 902.

At block 706, a housing component camera assembly (e.g., housing component 104, or the like) is lowered onto the base component camera assembly (e.g., base component 100, or the like) and shears the adhesive between respective surfaces of the base component camera assembly and the housing component camera assembly that are perpendicular to the top surface of the attachment wall. In various embodiments, some dependent upon placement of the glue and tolerances between the components, at least the overhanging glue is sheared down onto what is illustrated as vertical walls. In some embodiments, some or most of the glue that is not overhanging, but has been placed directly above the base wall 302 may also get dragged along and spread along onto what is illustrated as vertical walls as part of the shearing action. At block 708 the adhesive is cured. The process may or may not use a UV curing step, in embodiments.

FIG. 8 illustrates an example process chart for adhesive-based assembly of components of a camera that includes a UV-curing step, according to some embodiments. The process may be used in concert with components illustrated in FIGS. 3A-F, 4, 5, 6A-C, and 9A-C, for example. Similar to the process in FIG. 7, the process begins (at block 802), with an adhesive dispenser (e.g., adhesive needle 202, or the like) being aligned offset towards an outer surface of an attachment wall (e.g., base wall 302) of a base component camera assembly (e.g., base component 100). FIGS. 9A-C illustrate various alignments are possible, with corresponding effects on adhesive placement and corresponding effects on shearing of adhesive along the vertical walls is described for FIGS. 9A-C.

At block 804, adhesive 102 is applied onto at least a top surface of the attachment wall such that at least some adhesive extends beyond an outer edge of the top surface of the attachment wall. FIG. 3A illustrates an example application where adhesive is applied to a corner of base component 100, coming into contact with both surfaces that come together to form the corner. FIGS. 9A-C illustrate examples where glue is placed solely on the top surface, and sometime extends over as an overhang 902.

At block 806, housing component camera assembly (e.g., housing component 104, or the like) is lowered onto the base component camera assembly (e.g., base component 100, or the like) and shears the adhesive between respective surfaces of the base component and the housing component that are perpendicular to the top surface of the attachment wall. In various embodiments, some dependent upon placement of the glue and tolerances between the components, at least the overhanging glue is sheared down onto what is illustrated as vertical walls. In some embodiments, some or most of the glue that is not overhanging, but has been placed directly above the base wall 302 may also get dragged along and spread along onto what is illustrated as vertical walls as part of the shearing action. At block 708 the adhesive is cured.

At block 808, the housing component camera assembly is placed to a controlled Z-height, and the adhesive used to couple the camera module is UV-cured, at block 810. For example, the adhesive that is left exposed by the z-height at a gap between the base component and the housing component may be UV-cured. In embodiments, the UV-cure acts to enable movement of the camera module without disturbing the carefully-controlled Z-height, for example. At block 812, the camera module is moved to a heat-curing device, and the adhesive of the camera is heat cured, at block 814.

FIGS. 9A-C illustrate various alignments of an adhesive needle with respect to a base component onto which adhesive is being applied, according to some embodiments. In FIG. 9A a needle centerline 906 of needle 202 is shown as aligned offset to the left or more towards outer vertical wall 904. Such orientation of the needle 202 may cause various characteristics of adhesive 102 to be expressed as the adhesive is applied to the base component 100. For example, FIG. 9A illustrates that the particular orientation may be associated with creation of an overhang 902 of the adhesive when applied to base component 100. In some embodiments, z-gap 310 may be adjusted to affect characteristics of the adhesive 102 as applied to the base component 100. For example, increasing the z-gap may reduce overhang, and decreasing the z-gap may increase the overhang, depending on changes to the rate of flow of the adhesive, in some embodiments. FIG. 9B illustrates the needle centerline 906 being aligned more towards the inside or towards inner vertical wall surface 908 and a corresponding effect on the position of the adhesive 102 on the upper xy-plane surface of the base component 100. FIG. 9C illustrates the needle centerline 906 being aligned outside of outer vertical wall surface 904 and a corresponding increase in the amount of overhang 902 associated with the position of the adhesive 102 on the upper xy-plane surface of the base component 100.

FIG. 10 illustrates a schematic representation of an example device 1000 that may include a camera assembled according to techniques, and/or using components, as described herein with reference to FIGS. 1-9, according to some embodiments. In some embodiments, the device 1000 may be a mobile device and/or a multifunction device. In various embodiments, the device 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1000 may include a display system 1002 (e.g., comprising a display and/or a touch-sensitive surface) and/or one or more cameras 1004. In some non-limiting embodiments, the display system 1002 and/or one or more front-facing cameras 1004a may be provided at a front side of the device 1000, e.g., as indicated in FIG. 10. Additionally, or alternatively, one or more rear-facing cameras 1004b may be provided at a rear side of the device 1000. In some embodiments comprising multiple cameras 1004, some or all of the cameras may be the same as, or similar to, each other. Additionally, or alternatively, some or all of the cameras may be different from each other. In various embodiments, the location(s) and/or arrangement(s) of the camera(s) 1004 may be different than those indicated in FIG. 10.

Among other things, the device 1000 may include memory 1006 (e.g., comprising an operating system 1008 and/or application(s)/program instructions 1010), one or more processors and/or controllers 1012 (e.g., comprising CPU(s), memory controller(s), display controller(s), and/or camera controller(s), etc.), and/or one or more sensors 1016 (e.g., orientation sensor(s), proximity sensor(s), and/or position sensor(s), etc.). In some embodiments, the device 1000 may communicate with one or more other devices and/or services, such as computing device(s) 1018, cloud service(s) 1020, etc., via one or more networks 1022. For example, the device 1000 may include a network interface (e.g., network interface 1010) that enables the device 1000 to transmit data to, and receive data from, the network(s) 1022. Additionally, or alternatively, the device 1000 may be capable of communicating with other devices via wireless communication using any of a variety of communications standards, protocols, and/or technologies.

Figure 11:
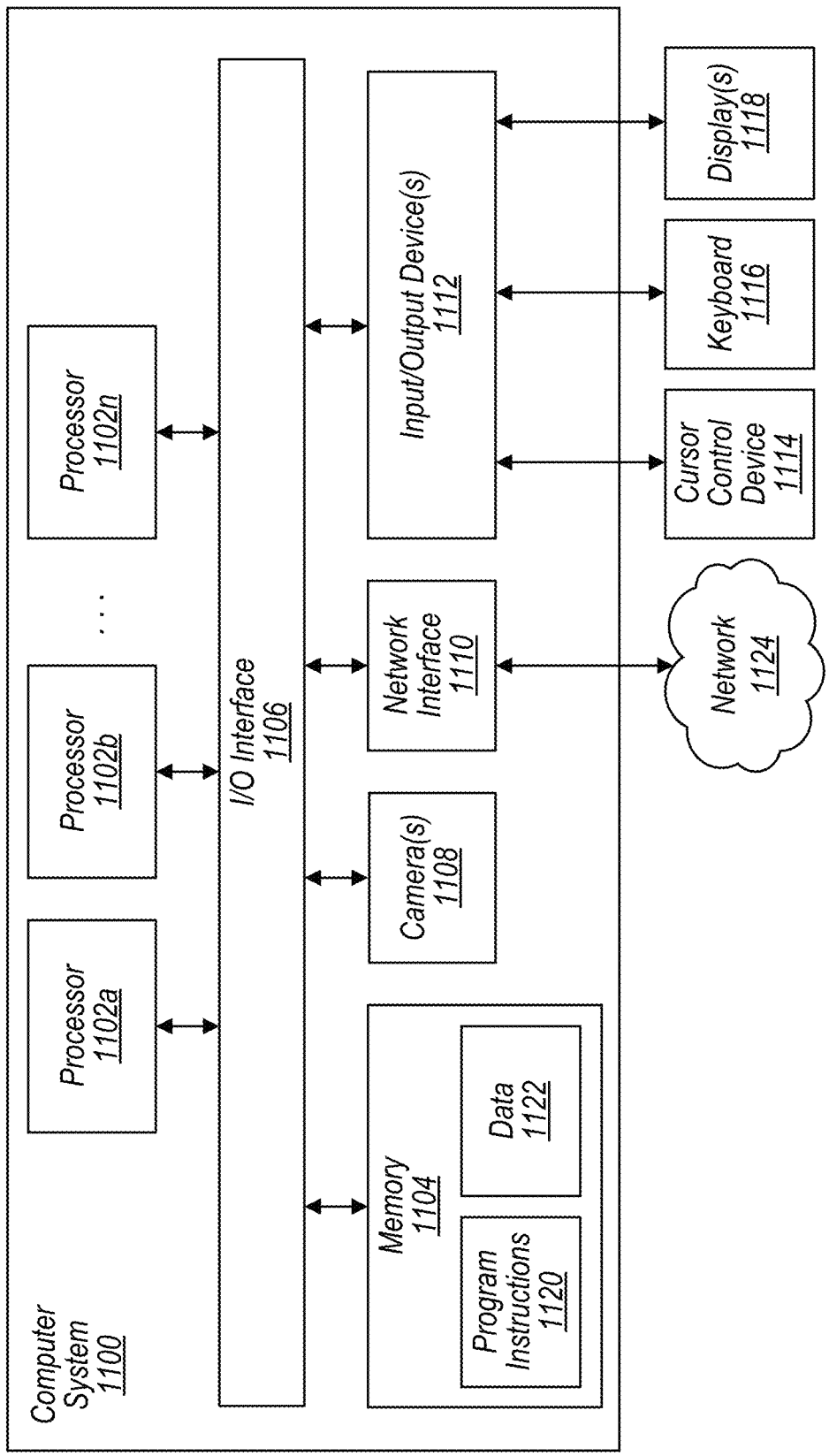
FIG. 11 illustrates a schematic block diagram of an example computing device which may include a camera subassembly assembled in a manner described herein, according to some embodiments.

FIG. 11 illustrates a schematic block diagram of an example computing device which may include camera assembled according to techniques, and/or using components, as described herein with reference to FIGS. 1-9, according to some embodiments. In addition, computer system 1100 may implement methods for controlling operations of the camera and/or for performing image processing images captured with the camera. In some embodiments, the device 1000 (described herein with reference to FIG. 10) may additionally, or alternatively, include some or all of the functional components of the computer system 1100 described herein.

The computer system 1100 may be configured to execute any or all of the embodiments described above. In different embodiments, computer system 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1100 includes one or more processors 1102 coupled to a system memory 1104 via an input/output (I/O) interface 1106. Computer system 1100 further includes one or more cameras 1108 coupled to the I/O interface 1106. Computer system 1100 further includes a network interface 1110 coupled to I/O interface 1106, and one or more input/output devices 1112, such as cursor control device 1114, keyboard 1116, and display(s) 1118. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1102, or a multiprocessor system including several processors 1102 (e.g., two, four, eight, or another suitable number). Processors 1102 may be any suitable processor capable of executing instructions. For example, in various embodiments processors 1102 may be general-purpose or embedded processors implementing any of a variety of instruction set architectures (ISAs), such as the x86, PowerPC, SPARC, or MIPS ISAs, or any other suitable ISA. In multiprocessor systems, each of processors 1102 may commonly, but not necessarily, implement the same ISA.

System memory 1104 may be configured to store program instructions 1120 accessible by processor 1102. In various embodiments, system memory 1104 may be implemented using any suitable memory technology, such as static random-access memory (SRAM), synchronous dynamic RAM (SDRAM), nonvolatile/Flash-type memory, or any other type of memory. Additionally, existing camera control data 1122 of memory 1104 may include any of the information or data structures described above. In some embodiments, program instructions 1120 and/or data 1122 may be received, sent or stored upon different types of computer-accessible media or on similar media separate from system memory 1104 or computer system 1100. In various embodiments, some or all of the functionality described herein may be implemented via such a computer system 1100.

In one embodiment, I/O interface 1106 may be configured to coordinate I/O traffic between processor 1102, system memory 1104, and any peripheral devices in the device, including network interface 1110 or other peripheral interfaces, such as input/output devices 1112. In some embodiments, I/O interface 1106 may perform any necessary protocol, timing or other data transformations to convert data signals from one component (e.g., system memory 1104) into a format suitable for use by another component (e.g., processor 1102). In some embodiments, I/O interface 1106 may include support for devices attached through various types of peripheral buses, such as a variant of the Peripheral Component Interconnect (PCI) bus standard or the Universal Serial Bus (USB) standard, for example. In some embodiments, the function of I/O interface 1106 may be split into two or more separate components, such as a north bridge and a south bridge, for example. Also, in some embodiments some or all of the functionality of I/O interface 1106, such as an interface to system memory 1104, may be incorporated directly into processor 1102.

Network interface 1110 may be configured to allow data to be exchanged between computer system 1100 and other devices attached to a network 1124 (e.g., carrier or agent devices) or between nodes of computer system 1100. Network 1124 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1110 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1112 may, in some embodiments, include one or more display terminals, keyboards, keypads, touchpads, scanning devices, voice or optical recognition devices, or any other devices suitable for entering or accessing data by one or more computer systems 1100. Multiple input/output devices 1112 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1110.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The assembly process described herein may be implemented manually, in software, hardware, or a combination thereof as part of an assembly process, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera module, comprising:
    a base component having a horizontal surface in an xy-plane and a wall that extends vertically from the horizontal surface, the wall having an outward-facing vertical surface including a portion facing in a x-dimension of the xy-plane and a portion facing in a y-dimension of the xy-plane;
    a camera sensor mounted to the horizontal surface of the base component, between opposing portions of the wall;
    a housing component having an inward-facing vertical surface including a portion facing in a x-dimension of the xy-plane and a portion facing in a y-dimension of the xy-plane, each of the portions adhered, with adhesive, to respective portions of the x-dimension-facing and y-dimension-facing portions of the outward-facing vertical surface of the wall of the base component; and
    an optical lens mounted to the housing component.

2. The camera module of claim 1, further comprising:
    an actuator, mounted to the housing component, for actuating optical image stabilization or autofocus for the one or more optical lenses.

3. The camera module of claim 2, wherein the actuator comprises one or more coils and one or more springs for one or more voice coil motors mounted to the housing component.

4. The camera module of claim 1, wherein:
    the wall extends from the horizontal surface to a height;
    the horizontal surface has xy-dimensions; and
    the height of the wall is less than the xy-dimensions of the horizontal surface.

5. The camera module of claim 1, wherein:
    the wall of the base component is a circumferentially-continuous wall formed around a location for the camera sensor; and
    the inward-facing vertical surface of the housing component is a continuous vertical surface.

6. The camera module of claim 1, wherein the wall of the base component is inset from a perimeter of the horizontal surface of the base component.

7. The camera module of claim 6, wherein:
the housing component is adhered, with adhesive, to the inset wall of the base component by at least one horizontal surface of the housing component.

8. The camera module of claim 1, wherein the adhesive contacts one or more horizontal surfaces of both the housing component and the base component, creating additional adhesion between the housing component and the base component.

9. The camera module of claim 1, wherein the base component and the wall of the base component are formed from molded plastic.

10. A multifunction device, comprising:
a camera module comprising:
  a base component having a horizontal surface in an xy-plane and a wall that extends vertically from the horizontal surface, the wall having an outward-facing vertical surface including a portion facing in a x-dimension of the xy-plane and a portion facing in a y-dimension of the xy-plane;
  a camera sensor mounted to the horizontal surface of the base component, between opposing portions of the wall;
  a housing component having an inward-facing vertical surface including a portion facing in a x-dimension of the xy-plane and a portion facing in a y-dimension of the xy-plane, each of the portions adhered, with adhesive, to respective portions of the x-dimension-facing and y-dimension-facing portions of the outward-facing vertical surface of the wall of the base component at the portion facing in the x-dimension and the portion facing in the y-dimension; and
  an optical lens mounted to the housing component;
one or more processors configured to display images captured by the camera module; and
a display to display the images captured by the camera module.

11. The multifunction device of claim 10, further comprising:
an actuator, mounted to the housing component, for actuating optical image stabilization or autofocus for the one or more optical lenses.

12. The multifunction device of claim 11, wherein the actuator comprises one or more coils and one or more springs for one or more voice coil motors mounted to the housing component.

13. The multifunction device of claim 10, wherein:
the wall extends from the horizontal surface to a height;
the horizontal surface has xy-dimensions; and
the height of the wall is less than the xy-dimensions of the horizontal surface.

14. The multifunction device of claim 10, wherein the wall of the base component is inset from a perimeter of the horizontal surface of the base component.

15. The multifunction device of claim 10, wherein the housing component is adhered, with adhesive, to the inset wall of the base component by at least one horizontal surface of the housing component.

16. The multifunction device of claim 10, wherein the adhesive contacts one or more horizontal surfaces of both the housing component and the base component, creating additional adhesion between the housing component and the base component.

17. The multifunction device of claim 10, wherein the base component and the wall of the base component are formed from molded plastic.

* * * * *